July 14, 1953 W. SCHILLER 2,645,052
FISH LURE
Filed April 11, 1949
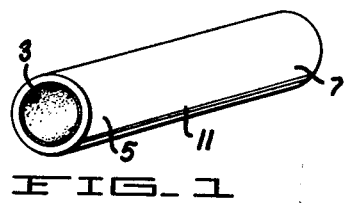
FIG_1
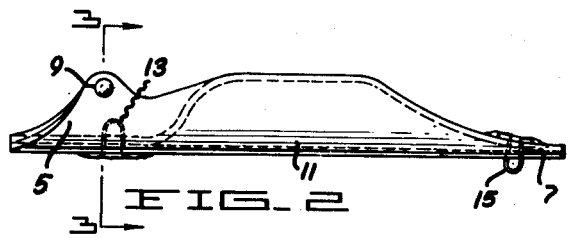
FIG_2
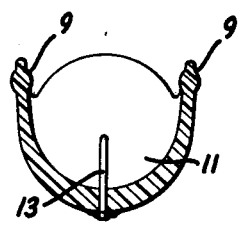
FIG_3
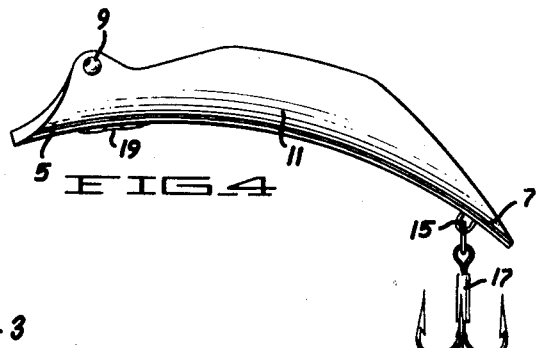
FIG_4
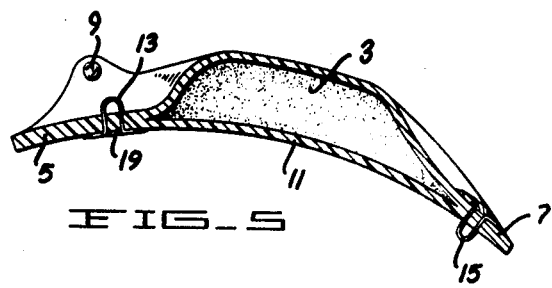
FIG_5
*INVENTOR.*
WALTER SCHILLER
BY
*Lippincott & Smith*
ATTORNEYS

UNITED STATES PATENT OFFICE 2,645,052

FISH LURE

Walter Schiller, Forestville, Calif.

Application April 11, 1949, Serial No. 86,697

3 Claims. (Cl. 43—42.33)

This application relates to fish lures, and particularly to casting lures adapted to move erratically when dragged through the water without spinning, simulating the motion of a minnow or other small fish.

Among the objects of my invention are to provide a lure which is exceedingly strong and not subject to breakage under the vicissitudes of casting or when snagged upon the bottom; to provide a lure which is practically impervious to the action of either fresh or salt water; to provide a lure having a metallic luster which will not tarnish; and to provide a lure which may be colored or tinted in any manner and wherein the color is as permanent as the lure itself.

Wobbling lures of wood or metal are not new. In order to get the wobbling or darting motion they must be asymmetrical in shape and such shapes are somewhat difficult to form with the materials that have been used. It has also long been known that bright surfaces having a metallic luster are very attractive to some kinds of fish. Such surfaces can readily be formed of flat pieces of metal, but when more elaborate forming operations are required, the plating or other surface finish is apt to crack, resulting in corrosion, particularly when the lure is used in salt water. Wooden lures of this general character are lighter and frequently cast better, but when formed into the most effective shapes there are inevitably cross-grained portions where the wood is weak and is liable to breakage either because of snagging on the bottom or when taken by a large fish. The lure of my invention is devised to avoid these disadvantages of the prior art devices while retaining or even augmenting their attractive character.

The nature of the lure of this invention and its method of construction can best be understood by reference to the accompanying drawings, wherein:

Fig. 1 illustrates blank tubing from which the lure is formed;

Fig. 2 shows an intermediate step in the construction of the lure;

Fig. 3 is a cross-sectional view of the structure of Fig. 2, taken along the plane 3—3;

Fig. 4 is a perspective view of the completed lure; and

Fig. 5 shows a longitudinal cross-sectional view of the structure of Fig. 4, the plane of section being taken substantially along the center of the lure.

In its preferred form the lure of my invention is formed from lengths of water-white thermoplastic tubing 1, although it is obvious that translucent or clear colored tubings could be used if desired. I prefer, however, to use the clear tubing since the lures formed in this manner, as will be described, have proved most effective with the various varieties of fish with which the lures have been tested. It is quite possible, however, that in other areas and with fish of other species, other colorations might be preferred, and I therefore do not wish to limit my invention to the uncolored tubing.

A layer of silver 3 is preferably next deposited upon the internal surface of the tubing. Except in the case of glass, silver will not usually precipitate from its salts, when acted upon by a reducing agent, on most plastics in such form as to make a satisfactory mirror surface such as desired here. I have found, however, that mirror surfaces may be formed in this conventional manner upon certain of the cellulose acetate base plastics, of which I have found the plastic marketed under the trade name of Tenite takes the coating most effectively and also possesses the qualities of tensile strength, resistance to shattering, and thermoplasticity to the desired degree.

The ends 5 and 7 of the tubing are then heated until they are in a thoroughly plastic state, and when they have reached this condition pressure is applied to each end to collapse one side of the tubing against the other as is shown in Fig. 2. The pressure is applied to a point which will cause the two sides of the tubing to adhere and to form an autogenous weld. This pressure may be conveniently applied in a die which will cause the material to flow in a slightly splayed form, and it is desirable that the cavity within the die be provided with indentations into which the material can flow to form lobes 9 on the forward end 5 of the lure, the collapsed portion of this end of the lure preferably being made longer than the rear end 7. I have found that the thin coat of silver which is all that need be used to give the lure a mirror surface does not interfere with the formation of the weld, since the flow of the material when the pressure is applied appears to pull the small crystals of silver apart sufficiently so that the plastic flows around and between them, and that while the weld still shows a metallic appearance when viewed by reflected light and thereby retains its attractiveness as a bait, when viewed by transmitted light it is semitransparent, the completed weld having some of the properties of a "half silvered" mirror. It will be understood that by "half silvered" mirror is meant a mirror having a uniform coating which is either so thin or is formed of such microscopically divided particles that a portion of the light falling upon it is reflected and another portion is transmitted. Such mirrors are commonly used as "ray splitters" in optical instruments. They appear as though completely reflecting when the illumination on the side from which viewed exceeds that upon the opposite side or as completely transmitting when the illumination conditions are reversed. The term "half silvered" is not to be considered as implying that exactly half of the light is reflected and half transmitted, but merely that a substantial portion follows the reflecting and transmitting paths respectively so that the appearance above mentioned obtains.

In Fig. 3, a cross-sectional view taken through the forward end portion 5 shows the concave shape of the collapsed weld with the lobes 9 being oppositely disposed along the extremities of this concave portion. The body portion 11 is also concavely tapered into the welded portion (Fig. 5) to allow fluid flow along this transverse and longitudinal concave portion of the lure to impart a wobbling action to the lure as it is drawn through the water. Fig. 5 also reveals a transverse and longitudinal concavity included in the rear end 7 of the lure. Also, as the lure is rapidly drawn through the water, light reflected from the half silvered concave portions of the lure and light transmitted through these portions produce the effect of lateral motion of the ends with respect to the body portion; hence, equivalent action of a three-sectioned lure is achieved without the necessity of a single joint.

Softening the ends of the material to the welding point also causes some softening of the intermediate body 11, and permits the entire lure to be bent into a generally arcuate form as is shown in Fig. 4. This operation can be performed in the same die which makes the weld, or the bending can be done after removal from the welding die as a separate operation. In either case the bending is in such direction that the concave side of the concavo-convex weld is on the outer curvature of the arc.

While the material is still warm and plastic holes are pierced through each of the welded ends through which are threaded loops 13 and 15 for the attachment, respectively, of a fish line (not shown) and fish hook 17. Preferably the loops are made of wire, the ends of which can be twisted and folded back against the body of the lure, after which I prefer to seal the holes and imbed the twisted ends in a thick lacquer 19, the vehicle of which is also a solvent for the cellulose plastic. Under these circumstances the lacquer practically incorporates with the body of the material and forms a part thereof, and the attachment loops, instead of weakening the device as would ordinarily be the case, actually serves to reinforce and strengthen it.

It would, of course, be possible to use a clear lacquer for this purpose. I find, however, that the effectiveness of the lure as an attractive is increased by using a black lacquer, and I further find that additional touches of lacquer on the lobes 9 appear to increase its effectiveness. The lobes are not, however, solely for the decorative or attractive purpose, since they increase the instability of the lure as dragged through the water and augment its wobbling darting motion.

If desired, other lacquers, either clear or semi-opaque, can be applied over the entire surface. A clear yellow lacquer will convert the silver luster of the lure to a golden one which attracts fish in some waters although, on the average, I have found that the silver mirror surface is most effective of all. It is characteristic of all of these finishes when applied to the plastic body of the device that they become to all intents and purposes a part of the body and will not scrape or flake off as finishes do from most lures under hard usage.

I claim:

1. A fish lure formed of material initially having tubular contour, said lure comprising forward and rear portions and an intermediate hollow portion closed at each end, the forward and rear portions depending from the intermediate portion so as to define therewith an overall arcuate structure, said rear portion being concave transversely and longitudinally and the forward and rear portions being approximately equal to the intermediate portion in length, said forward and rear portions having provision for the attachment of a fishing line and hooks thereto.

2. In a fish lure provided with an attaching means for lines and hooks, a substantially tubular body having walls at the ends thereof in a compressed condition merging into each other so as to define substantially single walled structures longitudinally and transversely concave in section, the intermediate portion of the body being hollow and having its inner wall surfaces extending in opposite directions and provided with a reflecting coating, the end walls having a partially reflecting coating in portions thereof away from the exterior surface thereof.

3. A fish lure in accordance with claim 2 wherein one of the end walls has lobes on oppositely transverse portions thereof, said lobes having material thereon to represent eyes.

WALTER SCHILLER.

References Cited in the file of this patent

UNITED STATES PATENTS

| Number | Name | Date |
| --- | --- | --- |
| 231,912 | Irgens | Sept. 7, 1880 |
| 2,103,898 | Ridenour | Sept. 10, 1935 |
| 2,116,994 | Bear | May 10, 1938 |
| 2,148,799 | Bilinski | Feb. 28, 1939 |
| 2,163,666 | Carter | June 27, 1939 |
| 2,186,780 | De Witt | Jan. 9, 1940 |
| 2,192,563 | Starkey | Mar. 5, 1940 |
| 2,241,941 | Bates | May 13, 1941 |
| 2,270,488 | Withey | Jan. 20, 1942 |
| 2,522,179 | Jensen | Sept. 12, 1950 |